March 29, 1927.

D. K. SWARTWOUT

VENTILATING AND HEATING SYSTEM FOR MOTOR VEHICLES

Filed Nov. 23, 1921

1,622,359

3 Sheets-Sheet 1

Inventor
Denton K. Swartwout
By Hull, Brock & West
Attys.

March 29, 1927. 1,622,359
D. K. SWARTWOUT
VENTILATING AND HEATING SYSTEM FOR MOTOR VEHICLES
Filed Nov. 23, 1921    3 Sheets-Sheet 3
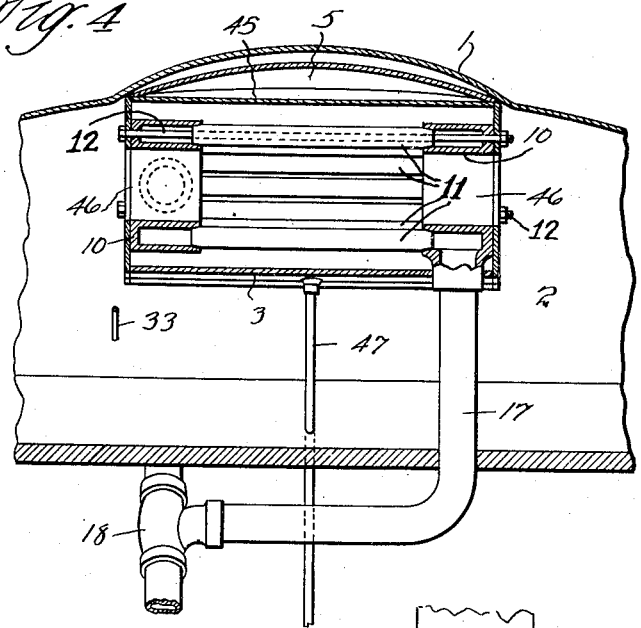
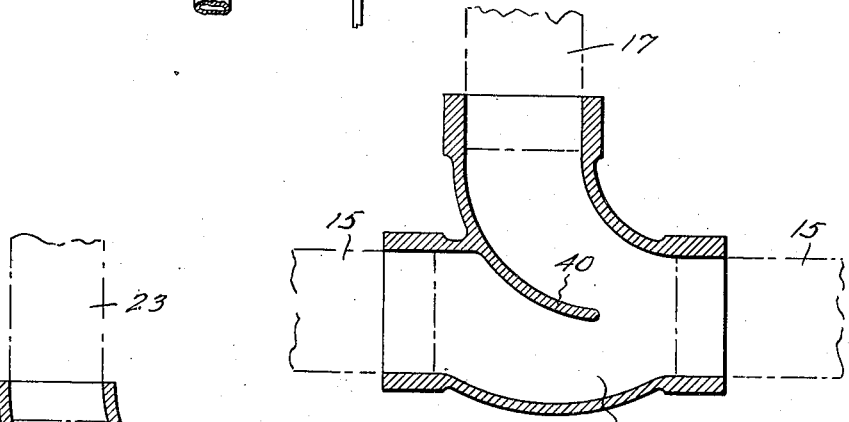
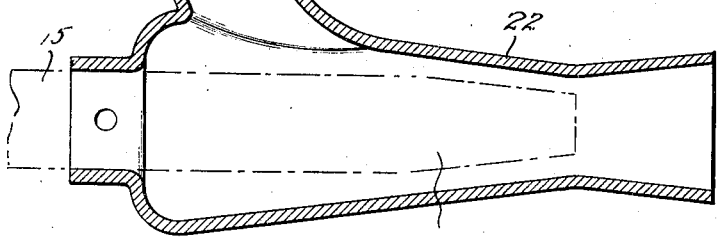
Inventor
Denton K. Swartwout
By Hull, Brock & West
Attys.

Patented Mar. 29, 1927.

1,622,359

UNITED STATES PATENT OFFICE.

DENTON K. SWARTWOUT, OF CLEVELAND, OHIO.

VENTILATING AND HEATING SYSTEM FOR MOTOR VEHICLES.

Application filed November 23, 1921. Serial No. 517,206.

This invention relates to a heating and ventilating system for conveyances, and more particularly to one that is peculiarly adapted for use with closed motor vehicles.

The aim of my present invention is to effectually ventilate and, if desired, heat a closed vehicle by withdrawing therefrom the vitiated air and providing a ventilator through which fresh air may be admitted to the vehicle, preferably incorporating in the ventilator means for extracting water, moisture or other foreign substances wherewith the air may be laden from the air before admitting it to the vehicle, together with means for heating the air at the option of the occupants of the vehicle.

At the present time I prefer to employ as the means for admitting the air to the vehicle and for heating it, a combined ventilator and heater similar to that disclosed in my copending application entitled "Ventilating and heating means for conveyances", filed October 1, 1921, Serial No. 504,814; and to associate with this ventilator and heater, an exhauster connected with a part of the vehicle remote from the ventilator and through which a current of air is induced, preferably by utilizing the exhaust gases from the internal combustion engine of the vehicle in a contrivance operating on the principle of an ejector.

Further objects of the invention are to provide a comparatively simple and highly efficient means for thoroughly ventilating a closed vehicle and by which the air admitted to the vehicle may be dried and cleaned, and heated to the desired degree, and which is very durable and immune from disorder and which lends itself very readily to incorporation in existing types of automobiles.

A further object is to provide an arrangement by which any desired amount of the exhaust gases of the internal combustion engine may be directed through the heater and thence into the exhaust line.

Figure 1:
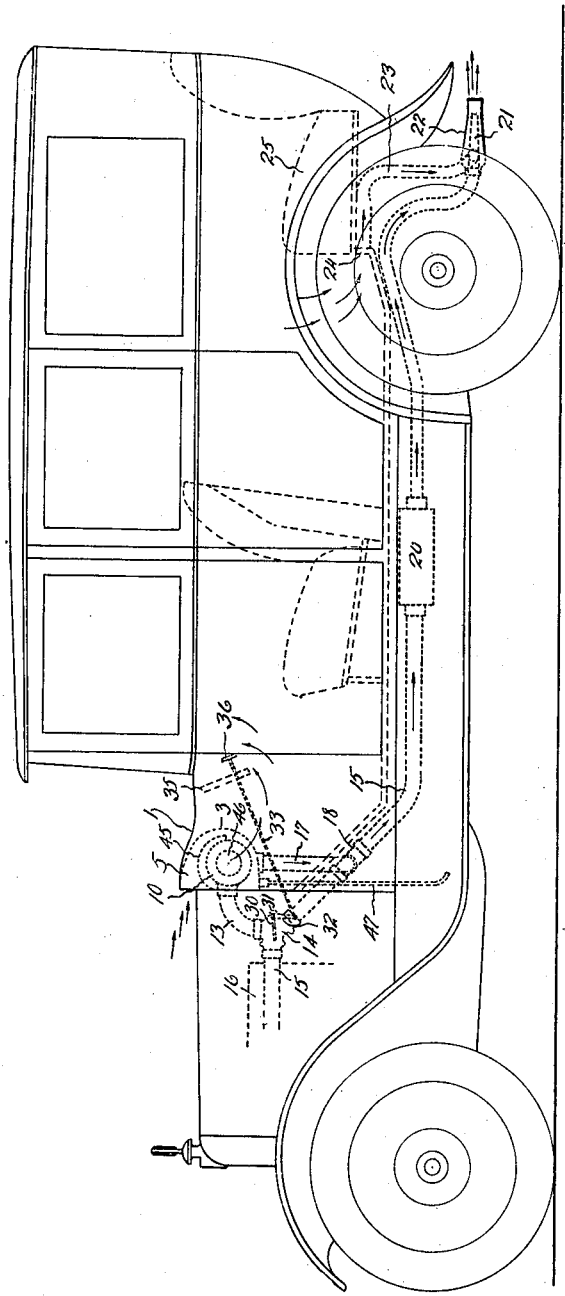
Figure 2:
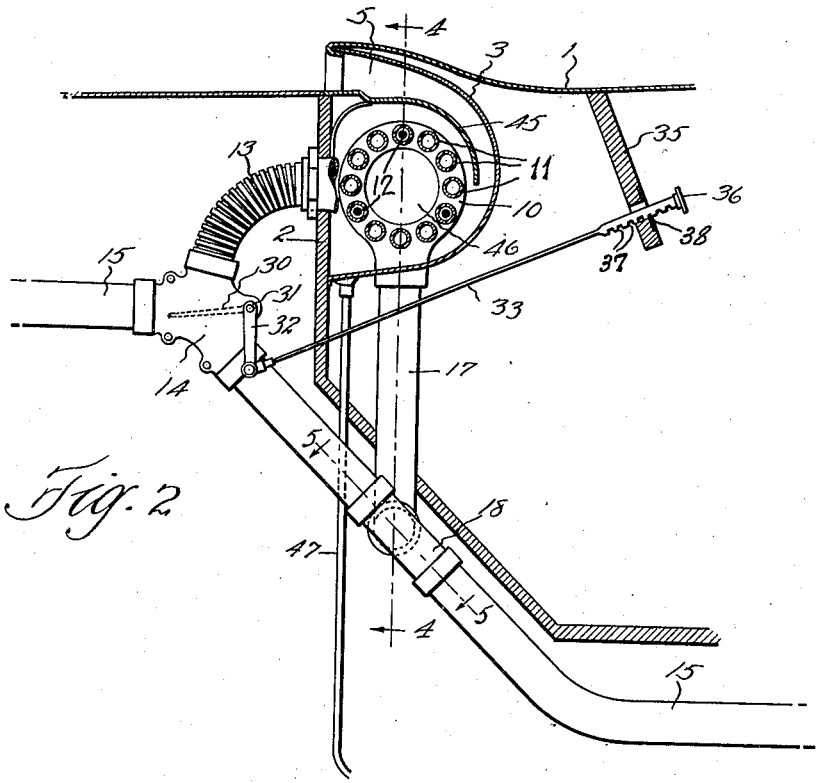
Figure 3:
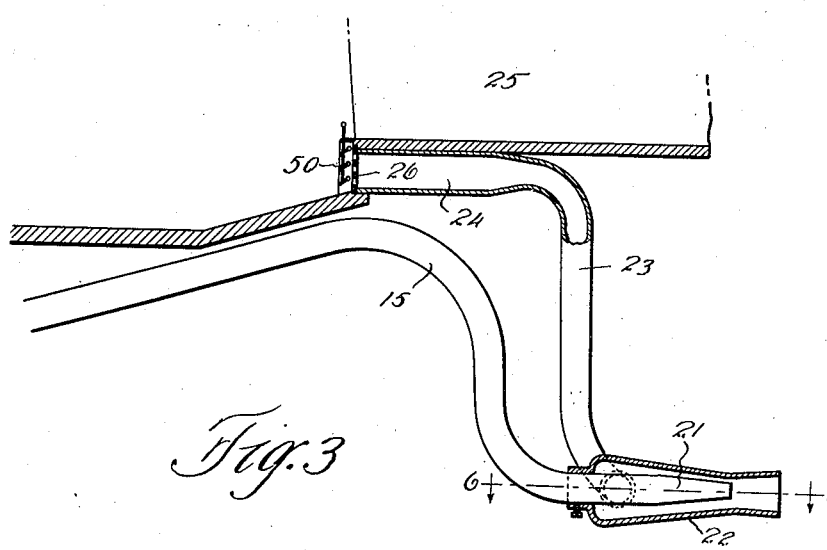

The foregoing objects, and others which will appear as this description proceeds, are attained in the embodiment of the invention illustrated in the drawings accompanying and forming a part of this specification and wherein Fig. 1 represents a side elevation of a closed automobile equipped with my improved ventilating and heating system; Figs. 2 and 3 are enlarged longitudinal sectional views through the front and rear portions of the automobile, respectively, the first showing the ventilator and heater with its connections to the exhaust line, and the second showing the exhauster; Fig. 4 is a transverse vertical section through the ventilator and heater, the same being taken on line 4—4 of Fig. 2; Fig. 5 is a sectional detail on the line 5—5 of Fig. 2; and Fig. 6 is a section on the line 6—6 of Fig. 3, showing the exhauster.

Following, in all essential respects, the arrangement and construction disclosed in my former application above identified, I mount under the cowl 1 and to the rear of the dash 2 a ventilator casing 3 which opens toward the front of the vehicle through a raised portion 5 of the cowl. An annular header 10 is situated in each end of the casing, and these headers are connected through tubes 11, and shown as bound together by tie bolts 12 which extend through certain of said tubes. One of the headers has communication through a tube 13 with a valve casing 14 that is situated in the exhaust line 15 of an internal combustion engine 16, and the other has communication through a tube 17 with a T 18 that is also situated in the exhaust line rearwardly of the valve casing 14, the exhaust line leading on, through the muffler 20, to an ejector nozzle 21 that is housed within the exhauster casing 22 that is located below the rear end of the body of the vehicle. The exhauster casing communicates, through a tube 23, with an outlet opening 24 situated below the rear seat 25, the opening 24 preferably being covered by a grid 26.

A valve 30 is disposed transversely of the valve casing 14 and is connected to a shaft 31 which is journaled within the side walls of the casing toward the rear thereof and has secured to one of its ends, where it projects beyond the side of the casing, an arm 32 to the free end of which is pivotally connected a rod 33 that extends rearwardly and upwardly through the instrument board 35 and is equipped therebeyond with a knob 36 in convenient reach of the driver. By reciprocating this rod the valve 30 may be oscillated to deflect any part or all of the exhaust gases from the engine 16 through the tube 13 to the heater comprising the aforementioned headers 10, 10 and tubes 11. The rod 33 is shown as provided with notches 37 for holding engagement with a keeper plate 38 whereby the rod may be held in various longitudinal positions so as to maintain the valve 30 properly adjusted. The T 18, shown in detail in Fig. 5 has a deflector 40 which directs the exhaust gases from the heater rearwardly within the exhaust pipe 15 to properly entrain them within the current flowing through the pipe. By reason of the deflector 40, the current through the exhaust pipe has a tendency to draw the gases from the tube 17, preventing a choking of said tube or the backing up of gases therein.

The ventilator includes a curved wall 45 which directs the incoming air rearwardly about the heater, causing it to follow the curved outer wall of the ventilator casing and imparting to the air a swirling action as it passes on to the outlet openings 46 in the ends of the casing. This swirling action causes any foreign substance, such as rain, moisture or dust, to be extracted from the air and discharged through the drain pipe 47 which leads downwardly from the front portion of the casing and through the floor of the vehicle.

As the exhaust gases are discharged with considerable velocity through the contracted end of the nozzle 21, a suction is created within the exhauster casing 22 which draws the air through the tube 23 from the interior of the vehicle.

Thus it will be seen that by my invention a constant changing of the air within the vehicle, and a very thorough circulation of the air therethrough is effected, the air being cleaned by its passage through the ventilator and heated to any extent desired according to the adjustment of the valve 30. Such an arrangement has the advantages of providing ample ventilation while allowing all windows to be tightly closed so that in inclement weather the occupants of the vehicle are thoroughly protected, and by reason of the nature of the ventilator, it requires no adjustment, and may always be left open. Furthermore, because the outlet openings of the ventilator are directed toward the sides of the vehicle, the air entering therethrough sweeps along the sides and in cold weather, when the air is heated, offsets the effect of any drafts which may enter through the cracks of the doors or windows. Attention is also called to the fact that by keeping the engine running idly when the automobile is at rest, a circulation of air may be induced through the vehicle which will keep it thoroughly ventilated, and heated too when desired, a feature which is unique with my invention, as it will be recalled that in prevailing ventilating systems for vehicles, the flow of air through the ventilator is induced only by the forward motion of the vehicle. Also, by incorporating the heater in the ventilator and drawing the air through the vehicle, I have the equivalent of a forced draft ventilating and heating system under both running and standing conditions, and this is decided improvement over installations wherein the heater is merely placed in the vehicle with no means for creating a circulation of air to properly distribute the heat. It is obvious that shutters may be employed to control the passage of air through the ventilator and exhauster, and I have shown associated with the outlet opening 24 a set of adjustable louvers 50 by means of which the passage of air through said opening may be controlled.

Having thus described my invention, what I claim is:

1. In combination with an enclosed motor vehicle, means utilizing the exhaust gases from the motor for heating air that is discharged into the vehicle and positively withdrawing air from the vehicle.

2. In combination with a motor vehicle, means for admitting air thereto, a heater arranged to heat the air admitted, and means for withdrawing air from the vehicle, the heater and said means being actuated by the exhaust gases from the motor.

3. In combination with an enclosed motor vehicle, means for admitting air thereto, a heater arranged to heat the air admitted, an exhauster of the ejector type for withdrawing air from the vehicle, connections through which all the exhaust gases from the motor are directed through the exhauster, and means whereby any desired quantity of said gases may be by-passed through the heater.

4. In combination with a closed vehicle, means for admitting air thereto, a heater incorporated in said means for heating the air admitted to the vehicle, an exhauster connected to a part of the vehicle remote from the air admitting means for withdrawing air from the interior of the vehicle, said exhauster being of the ejector type, and means for directing the exhaust gases from the motor through the heater and through the ejector nozzle of the exhauster.

5. In combination with a motor vehicle, means for admitting air thereto, a heater for heating the air, and an exhauster for withdrawing air from the vehicle, the exhauster being of the ejector type, an exhaust pipe from the motor arranged to discharge through the ejector nozzle of the exhauster, a conduit leading from the exhaust pipe to the heater, a second conduit leading from the heater to the exhaust pipe rearwardly of said pipe's connection with the former conduit, and means whereby any part or all of the exhaust gases may be deflected through the heater.

6. In combination with a motor vehicle, means for admitting air thereto, a heater for heating said air, an exhauster of the ejector type for withdrawing air from the vehicle, an exhaust pipe leading from the motor and discharging through the ejector nozzle of the exhauster, connections between the exhaust pipe and the heater, connections between the heater and a part of the exhaust pipe rearwardly of the former connections, and a deflector situated in the exhaust pipe for entraining the gases from the last mentioned connections rearwardly into the current of gases flowing through the exhaust pipe.

In testimony whereof, I hereunto affix my signature.

DENTON K. SWARTWOUT.